United States Patent [19]

Delarue et al.

[11] Patent Number: 4,929,135

[45] Date of Patent: May 29, 1990

[54] DEVICE FOR TEMPORARILY COUPLING-UNCOUPLING TWO MEMBERS, AND FOR SUBSEQUENT SEPARATION THEREOF

[75] Inventors: Jean-Jacques Delarue, Paris Cedex; Michel Patin, Les Mureaux; Jean-Claude Slama, Plaisir, all of France

[73] Assignee: Aerospatiale Societe Nationale Industrielle, Paris, France

[21] Appl. No.: 417,760

[22] Filed: Oct. 5, 1989

[30] Foreign Application Priority Data

Oct. 5, 1988 [FR] France ............................... 88 13028

[51] Int. Cl.⁵ .................. F16B 19/00; F42B 15/10
[52] U.S. Cl. .................... 411/354; 411/267; 411/511; 102/378
[58] Field of Search ............... 411/267, 266, 353, 354, 411/348, 433, 511; 403/322, 325; 102/378, 351, 357

[56] References Cited

U.S. PATENT DOCUMENTS

| | | |
|---|---|---|
| 475,664 | 7/1888 | Gehrke . |
| 2,858,726 | 11/1958 | Robinson et al. . |
| 3,196,745 | 7/1965 | Sustrich et al. . |
| 3,334,536 | 8/1967 | Armstrong . |
| 3,597,919 | 8/1971 | Lily . |
| 4,002,120 | 1/1977 | Swales et al. . |
| 4,064,783 | 12/1977 | Ess . |
| 4,187,759 | 2/1980 | Toy et al. . |
| 4,585,369 | 4/1986 | Manesse et al. ............... 403/322 |
| 4,636,135 | 1/1987 | Bancon ........................... 403/322 |
| 4,836,707 | 6/1989 | Myers ............................. 403/325 |

FOREIGN PATENT DOCUMENTS 2550832 2/1985 France .

*Primary Examiner*—Neill R. Wilson
*Attorney, Agent, or Firm*—Browdy and Neimark

[57] ABSTRACT

A device for temporarily coupling together and subsequently separating a first member and a second member, comprises:

a male member joined to the first member;

a female member joined to the second member and comprising an axially elongate hollow body in which are disposed a retaining sleeve adapted to retract radially onto the male member or to expand, a piston sliding axially to retract/expand the retaining sleeve and, in the piston, disposed along the axis, an ejector finger joined to the piston by a readily broken member, and selective control means for the piston adapted to command movement of the piston and optionally simultaneous breaking of the readily broken member and to cause the ejector finger to slide axially, the finger projecting axially relative to the piston.

12 Claims, 5 Drawing Sheets

DEVICE FOR TEMPORARILY COUPLING-UNCOUPLING TWO MEMBERS, AND FOR SUBSEQUENT SEPARATION THEREOF

The invention concerns a device for temporarily coupling two members together comprising a separation unit for dissociating the members in response to a remotely generated triggering order.

A device of this kind finds particular applications in space. During the flight of a vehicle, the placing of a satellite in orbit or again during the carrying out of experiments on orbital stations there is a frequent need to unstow a wide variety of devices (to deploy arms, panels, etc).

Currently most known temporary coupling and separation devices can be divided between two large categories: explosive bolts, for example of a type described in the document FR-1.008.492, U.S. Pat. Nos. 3,053,131, 3,196,745 or 4,002,120, and explosive nuts as described in particular in the document 2,858,726, 3,204,505, 3,262,351 or 4,064,783.

All coupling operations carried out using these devices require procedures that are often delicate and in all cases involve direct manual intervention on the devices, which can be difficult, bothersome or even impossible in some configurations, surroundings or environments.

The invention is directed to alleviating this disadvantage by virtue of a temporary coupling and dissociation or separation device which has the major advantage of enabling, prior to separation/dissociation (or ejection or releasing), coupling and uncoupling operations adapted to be controlled automatically, that is to say without direct manual intervention.

The invention is therefore directed to enabling not only "mission" unstowing (releasing in flight, during placing of a satellite in orbit, etc) by pyrotechnic triggering but also, and beforehand, "maintenance" unstowing, triggering being then generated by gas or fluid pressure, the operations of assembly and disassembly being repeatable many times without damage, which is particular beneficial.

It is often indispensible during a maintenance phase to be able to verify over a period of time correct functioning of the object to be released and to be able to replace it in the event of it not functioning. In the same use contexts, the possibility of forming frequent automatic or non-automatic stowing and unstowing operations will be particularly appreciated by an astronaut working in zero gravity, a condition that does not favour complex manual operations. Even assuming manual intervention, in performing stowing and unstowing operations the astronaut will only be required to retain the object to be release or to centre it relative to the coupling device.

The invention therefore proposes, particularly for space applications but not exclusively so, a device for temporarily coupling two members together and subsequently separating them characterised in that it comprises a male member joined to one of these members and a female member joined to the other member, the female member comprising, in a hollow axially elongate body, a retaining sleeve adapted to retract radially onto the male member or to expand, a piston sliding axially to retract/expand the retaining sleeve and, in the piston, disposed along the axis, an ejector finger joined to it by a readily breakable member, selective control means being provided either to control only the movement of the piston or to additionally break the readily breakable member and cause the ejector finger to slide axially, the finger projecting axially relative to the piston.

According to preferred features of the invention:

the control means comprise a sealed chamber formed on one edge of the piston into which discharges a nozzle for injecting fluid at raised or reduced pressure;

the injection nozzle communicates with a first orifice adapted to be connected to a source of increased/reduced pressure and with a second orifice adapted to be connected to a pyrotechnic pressure source;

the retaining sleeve is formed of a plurality of sectors adapted to move away from and towards the axis;

each sector comprises an inclined edge forming a cam adapted to slide on a generally frustoconical edge of the piston and an opposite inclined edge forming a cam adapted to cooperate with a frustoconical ring joined to the body of the female member and adapted to have the male member pass through it;

a cylindrical guide section is mounted to slide axially along the retaining sleeve, generally frustoconical surfaces forming cams being provided externally on the retaining sleeve and internally on the guide section, being adapted by mutual cooperation to guide the sectors of the retaining sleeve as they retract and expand;

the guide section is part of a sheath sliding axially in the body of the female member against spring return means comprising a second cylindrical guide section of smaller diameter than the first section, sliding along the piston and the bottom of which, through which the injection nozzle passes, defines with the piston a sealed pressure chamber;

the spring return means are adapted to urge the sheath into a configuration in which the first guide section tends to hold the retaining sleeve retracted;

the male member comprises a retaining ring adapted to be retained axially by shoulders projecting radially from the inside of the retaining sleeve;

the readily breakable member is a transverse pin incorporating weakened areas.

Objects, characteristics and advantages of the invention will emerge from the following description given by way of non-limiting example with reference to the appended drawings in which.

Figure 1:
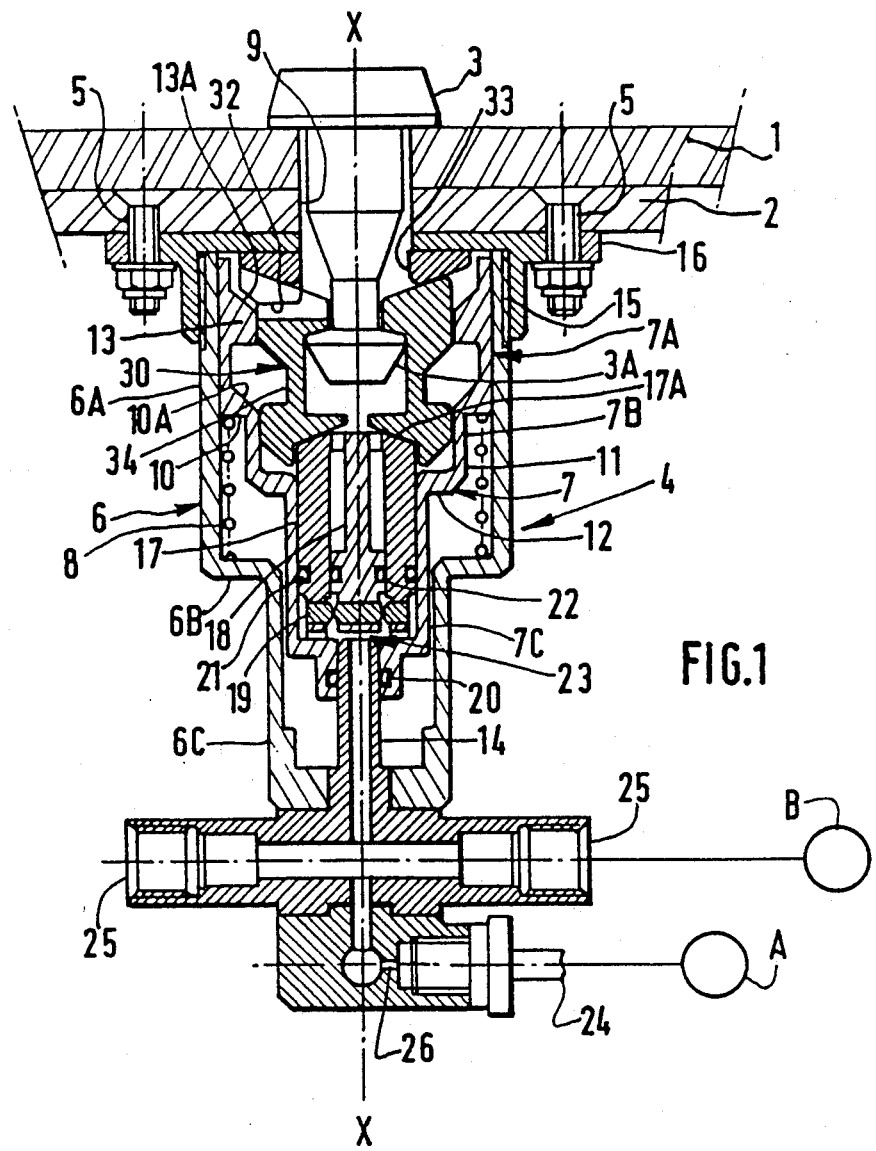
FIG. 1 is a view in axial cross-section of a temporary coupling and separation device in accordance with the invention in the coupling configuration.

FIGS. 1 through 6 show in various configurations a temporary coupling and separation device adapted to couple together and uncouple at will two members 1 and 2 mobile relative to each other. The device comprises a male member 3 joined to one of the members 1 and incorporating a radially rejecting ring 3A and a female member 4 joined to the other member 2. In practice the female member 4 is joined to that of the members which is fixed relative to a supporting structure (not shown), for example the body of a satellite.

The male and female members are joined to the members to be coupled and uncoupled by any appropriate known means, in this instance by welding in the case of the male member 3 and by bolts 5 in the case of the female member 4.

The female member 4 includes a hollow body 6 in which is formed a housing having a longitudinal axis of symmetry X—X and inside which a sheath 7 is adapted to slide against spring return means 8, in this instance a coil spring, which urge it to a position near the member 2 in which is an orifice 9 adapted to have the male member pass through it.

Here this housing has a first cylindrical zone 6A of large diameter near the member 2 joined by a transverse shoulder 6B, against which the spring 8 bears, to a second cylindrical zone 6C of smaller diameter.

The body 6 is joined by an external screwthread 15 to a cap 16 partially closing the housing and fixed to the member 2 by the bolts 5.

The sheath 7 is shaped to comprise a generally cylindrical section 7A of large diameter adapted to slide with small clearance in the upper zone 6A of the housing and a cylindrical section 6C of smaller diameter adapted to slide with small clearance in the zone 6C of the housing. Between the zone 7A and 7C is a transition section 7B comprising, starting from the zone 7A, a first shoulder 10 for the spring 8 to bear against, an intermediate cylindrical section 11 and a second shoulder 12 merging with the section 7C. The first cylindrical section 7A comprises internally an annular rib 13 delimiting with the first shoulder 7C a groove 14. The annular rib 13 and the first shoulder 10 have, facing towards the orifice 9, frustoconical surfaces 10A and 13A forming cams.

The sheath 7 has at the end of the second section an orifice through which passes an injection nozzle 14 fastened to the hollow body 6 and disposed along the axis X—X. The injection nozzle 14 communicates through a block with a first orifice 24 adapted to be connected to a source A of a fluid at increased or reduced pressure and with one or two orifices 25 adapted to be connected to a pressure source B adapted to supply sudden pressure transitions; in practice this is pyrotechnic device. Note that in the example under consideration a restriction 26 is provided between the orifice 24 and the injection nozzle 14.

Inserted into the second section 7C of the sheath 7 is a hollow piston 17 in which is mounted an ejector finger 18 joined initially to the piston 17 by a readily broken pin 19.

Respective seals 20, 21 and 22 are provided between the orifice at the end of the second section 7C and the injection nozzle 14, between the wall of the second section 7C and the hollow piston 17 and between the interior wall of the latter and a guide portion of the ejector finger 18. In more precise terms these seals are carried by the orifice at the end of the second section 7C, by the exterior wall of the hollow piston 17 and by the exterior wall of the guide portion of the ejector finger 18.

There is therefore formed between the end of the second section 7C and the piston 17 completed by the guide part of the ejector finger a sealed chamber 23 into which the injection nozzle 14 discharges.

In the first section 7A of the sheath 7 and therefore near the member 2 to be coupled is mounted a retaining sleeve or ring 30 the axis of which is coincident with the axis X—X and which is adapted either to retract radially to lock the male member 3 in position or to expand radially to release it in response to the action of the operating member constituted by the piston 17.

Figure 4:
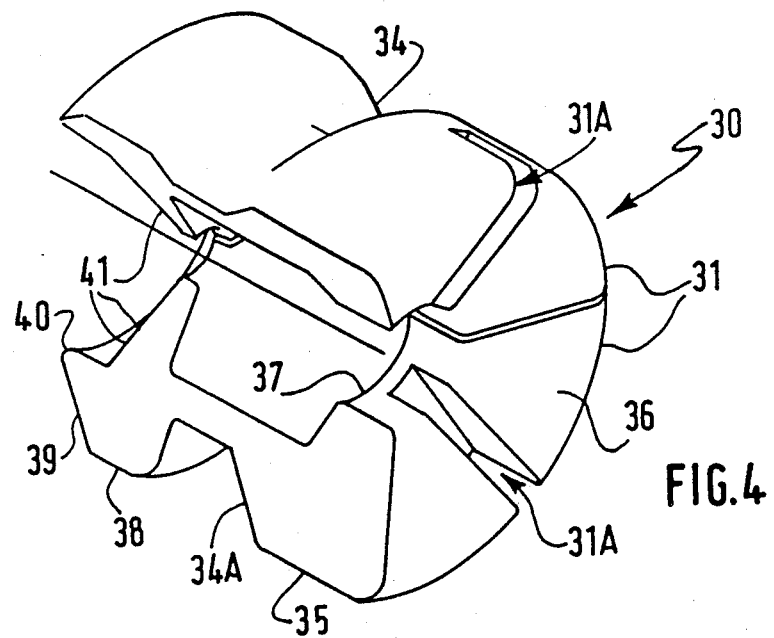
FIG. 4 is a partial perspective view of the attachment sleeve showing its upper part.
Figure 5:
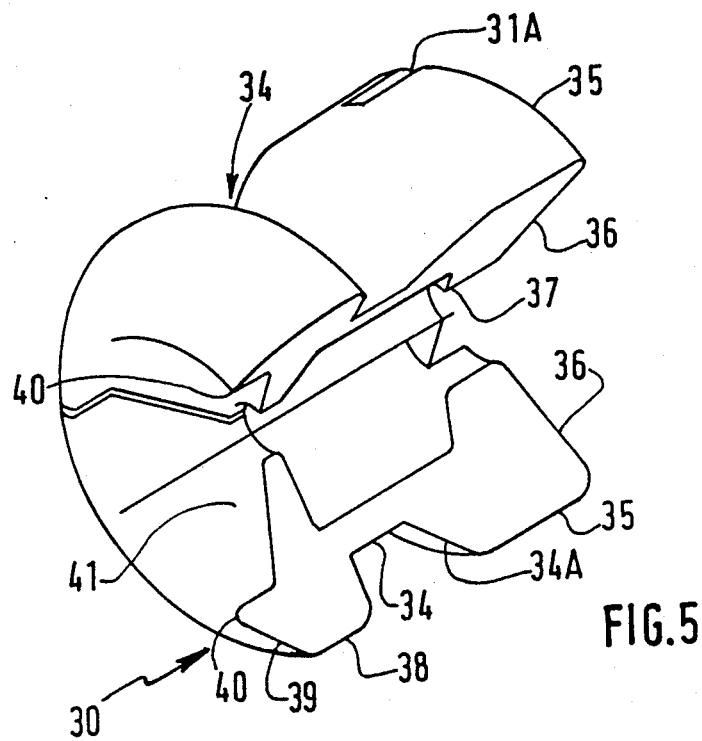
FIG. 5 is a similar view of it showing its lower part.
Figure 6:
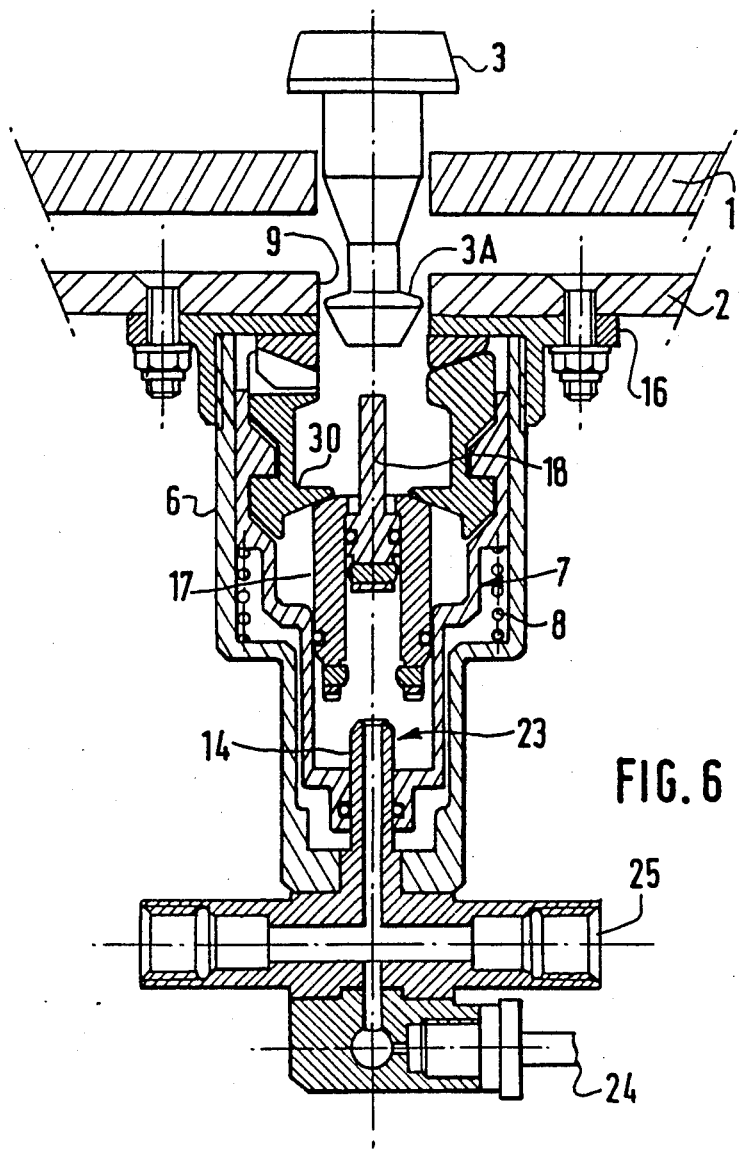
FIG. 6 is a view in axial cross-section of the device from FIGS. 1 through 3 in the ejection configuration.

This retaining sleeve (or attachment sleeve) 30 is here formed of three identical sectors 31, two of which are shown in perspective in FIGS. 4 and 5. There are advantageously inserted into the radial slots 31A of the sectors pins 32 fastened to a conical ring 33 fastened to the cap 16, adapted to enable radial movement of these sectors but to prevent any rotation thereof. Additional radial slots may be provided in the sectors (see FIGS. 1 through 3 and 6) to receive other, similar radial guide pins.

The sectors 31 have on their outside wall recessed areas 34 conjointly defining an annular groove the profile of which is complementary to that of the rib 13 of the sheath 7, with frustoconical surfaces 34A forming cams adapted to cooperate with the cam 13A of the annular rib 13.

The frustoconical surfaces 34A merge in the direction towards the member 2 with projecting portions 35 conjointly forming an upper rib adapted to slide axially within the annular rib 13. These projecting portions 35 are flanked by edges 36 inclined relative to the axis X—X and adapted to slide radially on the conical ring 33. The edges are extended radially towards the axis so as to form a retaining shoulder 37 adapted to retain the retaining ring 3A of the male member 3.

The recessed areas 34 merge in the direction towards the second section 7C of the sheath through projecting areas 38 conjointly defining a radially projecting rib adapted to slide axially along the intermediate cylindrical section 11.

In the example shown the cylindrical surfaces flanking externally the projecting areas 35 and 38 are the same diameter and the same goes for the cylindrical surfaces flanking internally the rib 13 and the intermediate section 11.

The radially projecting areas 38 merge at inclined edges 39 forming cams featuring axial projections 40 adapted to lie externally along the hollow piston 17 and inclined surfaces extending towards the axis 41 adapted in the manner of cams to slide on the frustoconical edge 7A of the piston.

Figure 2:
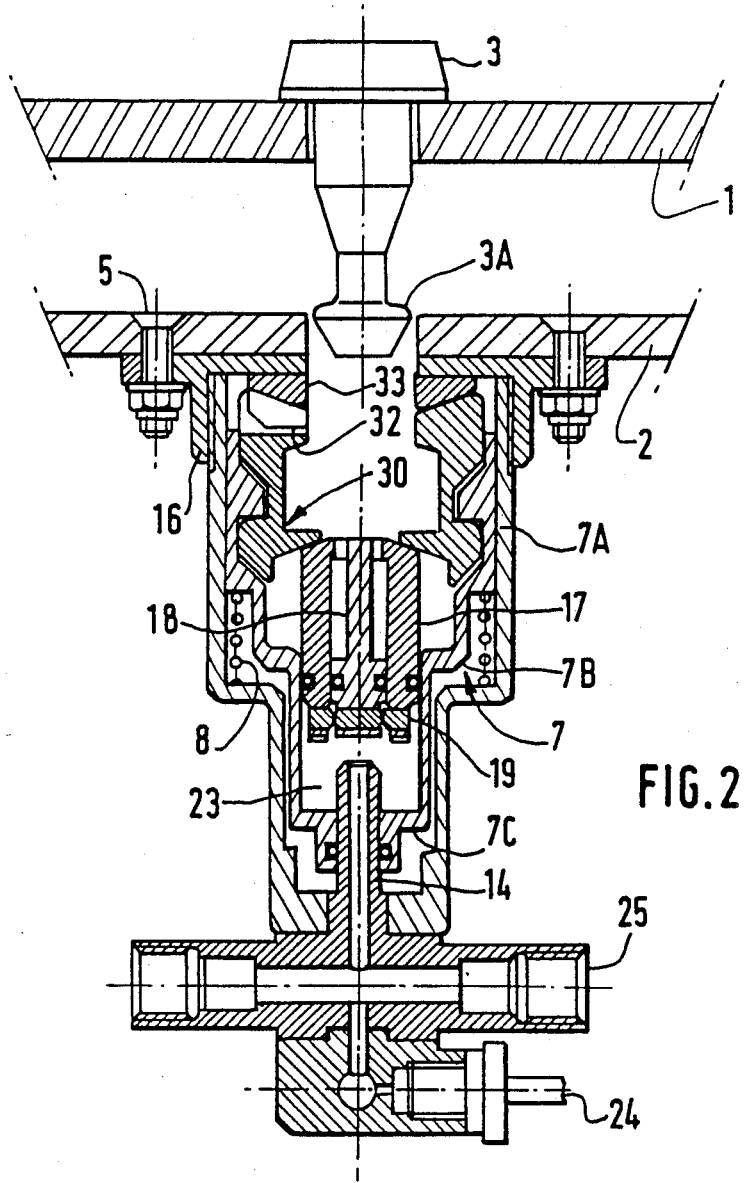
FIG. 2 is a similar view of it in the uncoupling configuration.
Figure 3:
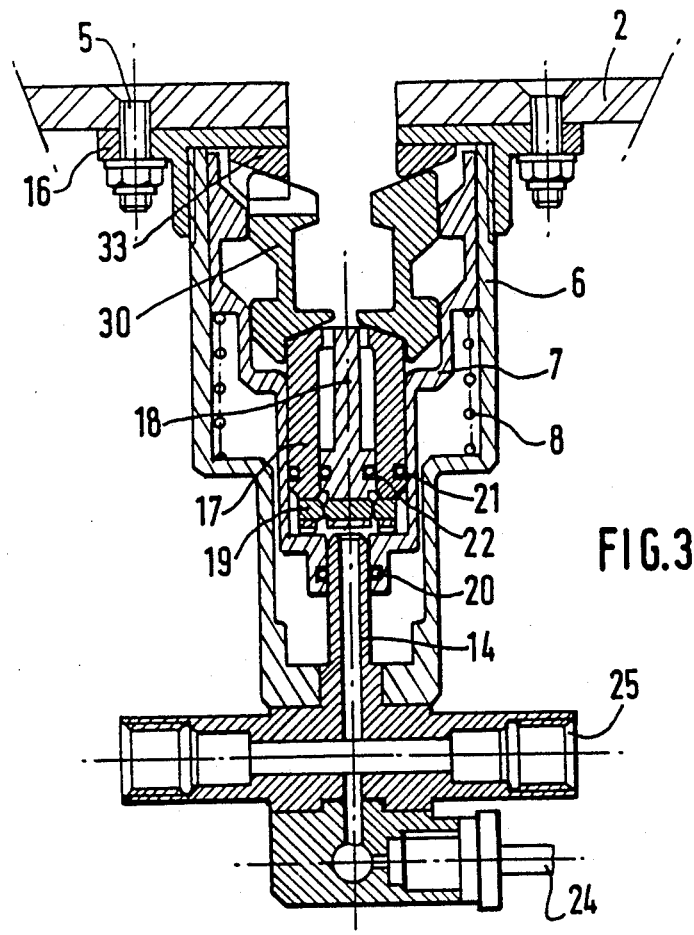
FIG. 3 is a similar view in the retracted configuration of only the female member of the device from FIGS. 1 and 2.

FIGS. 1 and 2 respectively show the device in the locked and released configurations.

When unoperated, by virtue of the spring 8 the device assumes the configuration of FIG. 1. Application to the orifice 24 of fluid under pressure results, because of the restriction 26, in the injection into the chamber 23 of a pressure that varies progressively. This raises the piston 17 which, because of the collaboration of the surfaces 41 and 17A and the surfaces 13 and 36, forces the sectors 31 of the retaining sleeve apart until the projections and the recesses on the sheath and on the sleeve fit one within the other. The male member is then released: the member 2 can then be moved away by any appropriate means, in particular manually or by a servo system. This leads to the configuration of FIG. 2.

If it is required to re-lock the members 1 and 2 the male member is inserted into the retaining sleeve and a reduced pressure is created in the chamber 23, the volume of which then tends to decrease. The piston 17 moves back and, because of the spring 18, the sheath 7 rises in the body 6 and moves the sectors 31 of the retaining sleeve towards each other to trap the retaining ring 3A.

These operations can be repeated without damage as many times as required.

When the member 1 is finally to be released, a pyrotechnically produced pressure is fed to the orifices 25 which as previously causes the piston 17 to rise and the sectors 31 of the sleeve 30 to move apart; additionally, however, beyond a predetermined pressure threshold the readily broken pin 19 is broken and the ejector finger 18 rises suddenly, which causes the male member to be ejected forcibly from the female member.

It goes without saying that the foregoing description has been given by way of non-limiting example only and that numerous variants may be put forward by those skilled in the art without departing from the scope of the invention.

Naturally multiple devices of the type described could be used to couple and uncouple the members 1 and 2, the synchronisation of the release operations being obtained by the serial connection of the orifices 25 with minimum head losses.

We claim:

1. Device for temporarily coupling together and subsequently separating a first member and a second member, comprising:

a male member joined to the first member;

a female member joined to the second member and comprising an axially elongate hollow body in which are disposed a retaining sleeve adapted to retract radially onto the male member or to expand, a piston sliding axially to retract/expand the retaining sleeve and, in the piston, disposed along the axis, an ejector finger joined to the piston by a readily broken member, and selective control means for the piston adapted to command movement of the piston and optionally simultaneous breaking of the readily broken member and to cause the ejector finger to slide axially, the finger projecting axially relative to the piston.

2. Device according to claim 1 wherein the control means comprise a sealed chamber formed against one edge of the piston into which discharges a nozzle for injecting fluid under pressure.

3. Device according to claim 2 wherein the injection nozzle communicates with a first orifice adapted to be connected to a source of increased/reduced pressure and with a second orifice adapted to be connected to a pyrotechnic pressure source.

4. Device according to claim 1 wherein the retaining sleeve is formed of a plurality of sectors adapted to move away from and towards the axis.

5. Device according to claim 4 wherein each sector comprises an inclined edge forming a cam adapted to slide on a generally frustoconical edge formed on the piston and an opposite inclined edge forming a cam adapted to cooperate with a frustoconical ring joined to the body of the female member and adapted to have the male member pass through it.

6. Device according to claim 5 wherein a cylindrical guide section is mounted to slide axially along the retaining sleeve, generally frustoconical surfaces forming cams being provided externally on the retaining sleeve and internally on the guide section, being adapted by mutual cooperation to guide the sectors of the retaining sleeve as they retract and expand.

7. Device according to claim 6 wherein the guide section is part of a sheath sliding axially in the body of the female member against spring return means comprising a second cylindrical guide section of smaller diameter than the first section, sliding along the piston and the bottom of which, through which the injection nozzle passes, defines with the piston a sealed pressure chamber.

8. Device according to claim 7 wherein the spring return means are adapted to urge the sheath into a configuration in which the first guide section tends to hold the retaining sleeve retracted.

9. Device according to claim 1 wherein the male member comprises a retaining ring adapted to be retained axially by shoulders projecting radially from the inside of the retaining sleeve.

10. Device according to claim 1 characterised in that the readily breakable member is a transverse pin incorporating weakened areas.

11. Device according to claim 2 wherein the retaining sleeve is formed of a plurality of sectors adapted to move away from and towards the axis.

12. Device according to claim 4 wherein the male member comprises a retaining ring adapted to be retained by shoulders projecting radially from the inside of the retaining sleeve.

* * * * *